United States Patent [19]

Hunt

[11] Patent Number: 4,940,147
[45] Date of Patent: Jul. 10, 1990

[54] VISUAL COMPACT DISK WALL RACK

[76] Inventor: Douglas J. Hunt, 105 Lone Oak Path, Smithtown, N.Y. 11787

[21] Appl. No.: 311,989

[22] Filed: Feb. 17, 1989

[51] Int. Cl.$^5$ .............................................. H47F 5/08
[52] U.S. Cl. ...................................... 211/40; 211/71; 211/88; 248/205.2
[58] Field of Search ...................... 211/41, 40, 87, 88, 211/89, 71; 206/387, 454; 248/205.2

[56] References Cited

U.S. PATENT DOCUMENTS

| | | | |
|---|---|---|---|
| 3,337,059 | 8/1967 | Le Hoy | 211/40 X |
| 3,773,183 | 11/1973 | Johnson | 211/71 |
| 3,908,830 | 9/1975 | Skrzelowski | 248/205.2 X |
| 4,132,311 | 1/1979 | Glinert | 206/387 |
| 4,254,880 | 3/1981 | Mangel | 211/41 |
| 4,645,075 | 2/1987 | Van der Lely | 211/41 X |
| 4,756,119 | 7/1988 | Chabot | 211/71 X |
| 4,840,339 | 6/1989 | Grogan | 248/205.2 |

Primary Examiner—Robert W. Gibson, Jr.
Attorney, Agent, or Firm—Richard L. Miller

[57] ABSTRACT

This visual compact disc wall rack is designed to display a multiple number of compact music disc cases. Primarily, a rack is composed of a rectangular frame having vertical and horizontal members defining compartment openings for receiving the cases, and hook pile fasteners are secured in the compartment openings or mating engagement with loop pile fasteners secured to the rear surfaces of the cases. Further provided are similar fasteners on the edges of the frame, so as to secure a pair or more of the frames together when desired in a grouping.

3 Claims, 1 Drawing Sheet

VISUAL COMPACT DISK WALL RACK

BACKGROUND OF THE INVENTION

The instant invention relates generally to display racks, and more particularly, to a visual compact disc wall rack.

Numerous racks have been provided in the prior art that are adapted to display various items. For example, U.S. pats. no. 4,232,790 of Serrano; 3,464,748 of Gregory, and 3,337,059 of LeHoy all are illustrative of such prior art. While these units may be suitable for the particular purpose to which they address, they would not be as suitable for the purpose of the present invention as hereafter described.

SUMMARY OF THE INVENTION

A primary object of the present invention is to provide a visual compact disc wall rack that will overcome the shortcomings of the prior art devices.

Another object is to provide a visual compact disc wall rack that will be of such design, as to display a plurality of compact discs for quick music selection.

An additional object is to provide a visual compact disc wall rack that will be so designed, as to connect one to another when hung in plurality.

A further object is to provide a visual compact disc wall rack that is simple and easy to use.

A still further object is to provide a visual compact disc wall rack that is economical in cost to manufacture.

Further objects of the invention will appear as the description proceeds.

To the accomplishment of the above and related objects, this invention may be embodied in the form illustrated in the accompaning drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
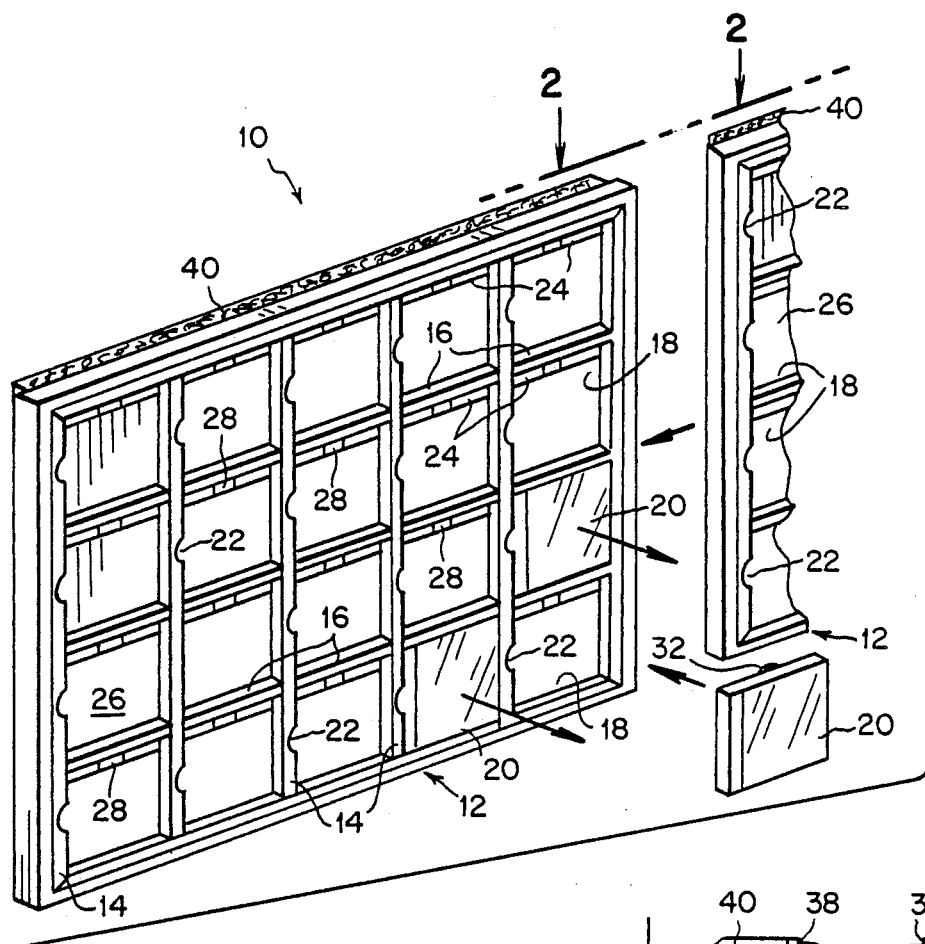
FIG. 1 is a diagrammatic perspective view of the instant invention.
Figure 2:
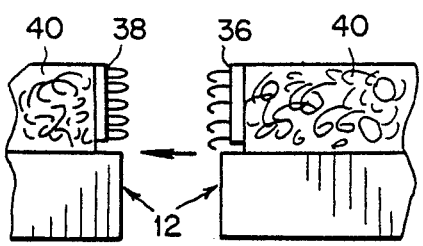
FIG. 2 is an enlarged view taken along line 2—2 in FIG. 1.
Figure 3:
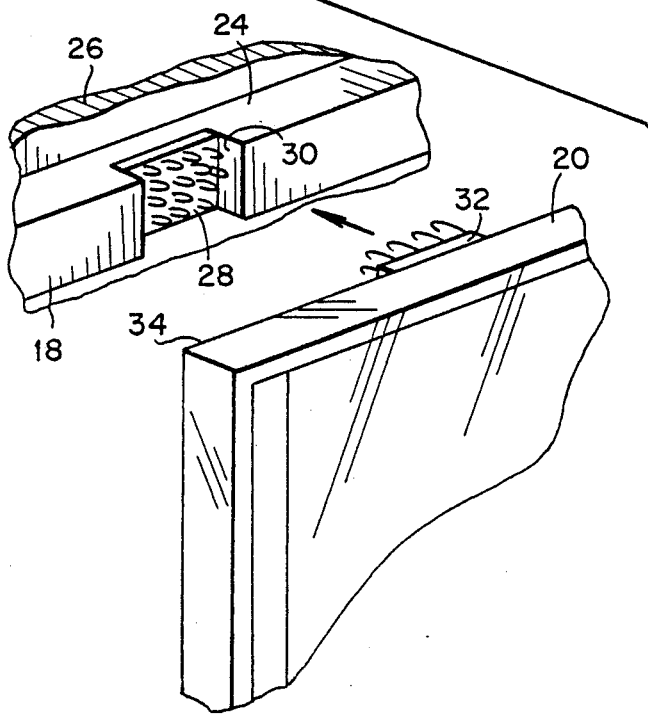
FIG. 3 is an enlarged fragmentary perspective view showing securement of the compact disc case to the instant invention.

Turning now descriptively to the drawings, in which like reference characters denote like elements throughout the several views, a wall rack 10 is shown to include a rectangular frame 12 having a plurality of equally spaced apart vertical members 14 fixedly secured at each end to longitudinal portions of frame 12, and equally spaced apart horizontal members 16 are fixedly secured between the vertical members 14 and provide recessed openings 18 that removably receive compact music disc cases 20.

Cut-out openings 22 are provided in edges of vertical members 14, so as to provide easy reception of a person's finger to remove compact music disc cases 20 from the recessed openings 18, and recessed in openings 18 are upper horizontal mounting strips 24 fixedly secured to a back board 26 that is fixedly secured to the rear of frame 12.

A loop pile fastener 28 is fixedly secured in a recessed opening 30 provided in horizontal mounting strips 24, and removably engages with a hook pile fastener 32 that is fixedly secured to a rear surface 34 of each case 20, the combination of the fasteners 28 and 32 serving to retain the cases 20 firmly in their respective openings 18, until it is desired to remove the cases 20.

The rear portions of the sides of frames 12 are recessed and a hook pile fastener strip 36 is fixedly secured to one side on one side of an adjacent frame 12, for securing the two frames 12 together at the sides, and the rear portions of the tops of frames 12 are recessed and loop pile fasteners 40 are fixedly secured therein, for mating engagement with hook pile fasteners (not shown) that are fixedly secured to the other longitudinal sides of additional frames (not shown).

In use, a pair of frames 12 are pressed together at the sides, which causes the fasteners 36 and 38 to engage and hold the frames 12 together, and the joined pair of frames 12 may be hung to a wall or other surface by any suitable fasteners (not shown).

The cases 20 are are placed in the openings 18 and are pressed inward, causing the fasteners 28 and 32 to engage. When it is desired to remove a case 20, a user's finger is inserted in the area of the openings 22 and a desired case 20 is pried or peeled away from the holding of the fasteners 28 and 32.

It shall be recognized that when it is desired to separate the pair of frames 12, they are grasped and pried away from each other.

It shall further be recognized that if a pair of frames 12 are secured one above the other, the same procedure is employed as above described.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A visual compact disc wall rack for removably storing compact music disc cases which comprises:
   (a) a frame having two vertical members and two horizontal members;
   (b) at least one additional vertical member equally spaced apart from each of the said two vertical members and fixedly secured at each end to said horizontal members of said frame;
   (c) at least one additional horizontal member also equally spaced apart from each of the said two horizontal members and fixedly secured at each end to said vertical members of said frame and thereby defining compartments that removably receive said compact music disc cases;
   (d) horizontal mounting strips fixedly secured into said frame, and hook and loop pile first fastener means attached to said mounting strips which cooperates with mating hook and loop pile for first fastener means secured to said compact music disc cases for holding the compact music disc cases into said frame;
   (e) a back board fixedly secured to said frame;

(f) a second mating hook and loop pile fastener means secured to an edge of said frame for holding duplicate pluralities of said frames together when displayed in a grouping; and
(g) a cut-out opening provided in some edges of one side of said vertical members whereby the tips of a person's finger may be received to remove a case of said compact music disc cases from said frame.

2. A visual compact disc wall rack as set forth in claim 1, wherein each one of said horizontal mounting strips is fixedly secured to said back board that is fixedly secured to said frame, and a loop pile fastener of said hook and loop pile first fasteners means is fixedly secured in a recessed opening provided in said horizontal mounting strips, and said loop pile fastener matingly engages with a hook pile fastener fixedly secured to a rear surface of said compact music disc case.

3. A visual compact disc wall rack as set forth in claim 2, wherein hook and loop pile fastener strips of said hook and loop pile second fastener means, are fixedly secured to recessed side, top and bottom portions of a pair of said frames for securing a plurality of said pair of frames together.

* * * * *